United States Patent [19]
Weiss et al.

[11] Patent Number: 5,901,534
[45] Date of Patent: May 11, 1999

[54] METAL DETECTOR FOR DETECTING METAL IN HARVESTED PRODUCT FLOW

[75] Inventors: Burkhard Weiss, Weigsdorf-Köblitz; Klaus Schulze, Langburkersdorf, both of Germany

[73] Assignee: Claas KGaA, Harsewinkel, Germany

[21] Appl. No.: 08/859,594

[22] Filed: May 20, 1997

[30] Foreign Application Priority Data

May 22, 1996 [DE] Germany ............... 196 20 526

[51] Int. Cl.⁶ .................................................. A01D 75/18
[52] U.S. Cl. .................................. 56/10.2 J; 56/DIG. 15
[58] Field of Search ..................... 56/10.2 J–DIG. 15

[56] References Cited

U.S. PATENT DOCUMENTS

| 3,889,249 | 6/1975 | Bennett, Jr. et al. . |
| 3,972,156 | 8/1976 | Bennett, Jr. et al. . |
| 5,078,645 | 1/1992 | Bohman et al. . |
| 5,343,676 | 9/1994 | Weiss .................... 56/10.2 J |
| 5,600,942 | 2/1997 | Strosser . |
| 5,627,475 | 5/1997 | Strosser . |

FOREIGN PATENT DOCUMENTS

| 0666021 A1 | 1/1995 | European Pat. Off. . |
| 0702248 A2 | 3/1996 | European Pat. Off. . |
| 4140812 A1 | 6/1993 | Germany . |

*Primary Examiner*—Heather Shackelford
*Attorney, Agent, or Firm*—Michael J. Striker

[57] ABSTRACT

A metal detector for detecting metal in a harvested product flow has a plurality of permanent magnets for producing a magnet field which passes through a harvested product flow region, a plurality of coils associated with the permanent magnets so that when a foreign body passes through the magnet field useful signals are produced, a signal processing unit operative for processing of the produced useful signals, a plurality of amplifiers and filters each connected to a respective one of the coils, a plurality of threshold value switches each connected with respect to one of the amplifiers and the filters and having output, an OR-circuit connected with the outputs of the threshold values, and stopping mechanisms connected with the OR-circuit.

5 Claims, 1 Drawing Sheet

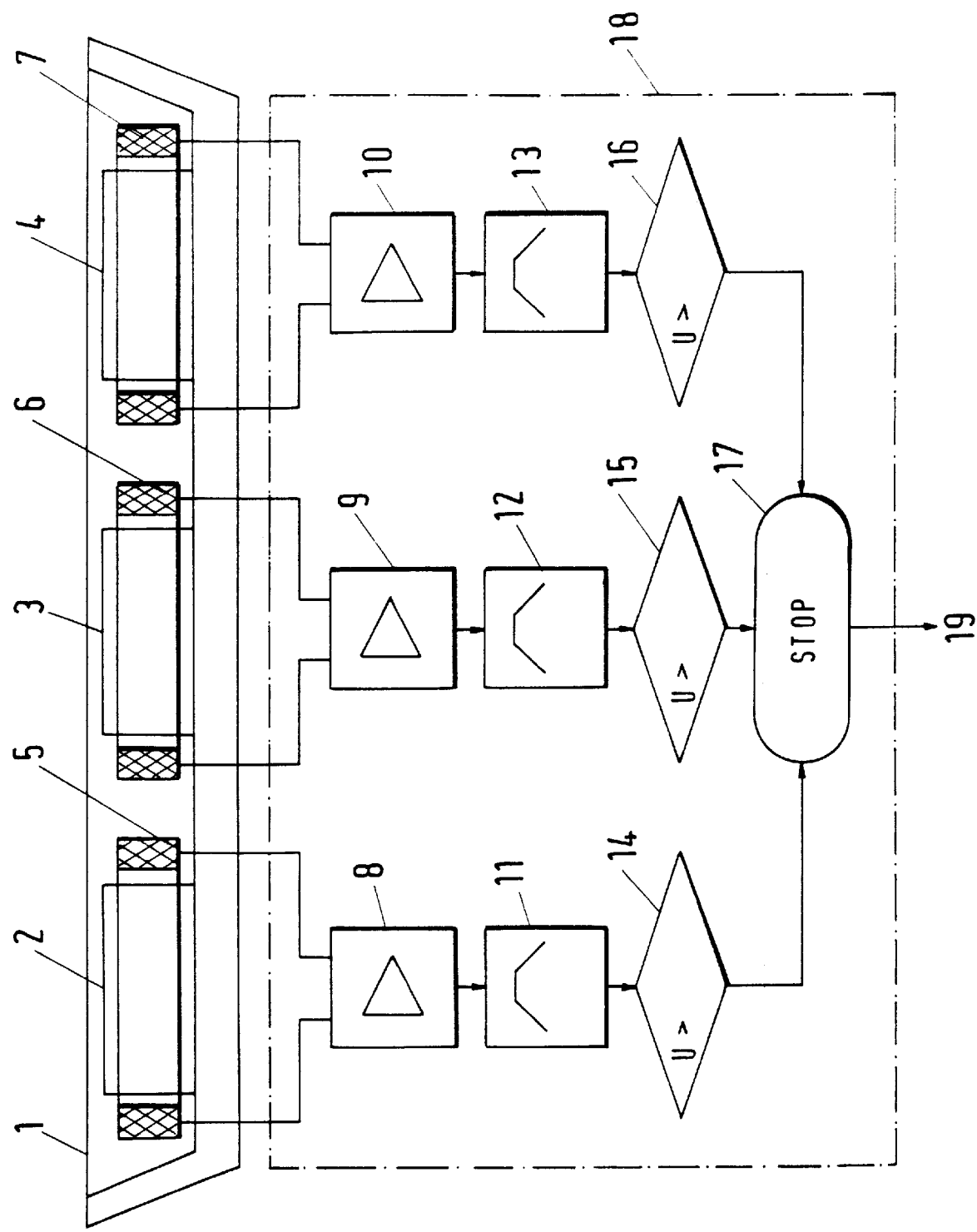

5,901,534

METAL DETECTOR FOR DETECTING METAL IN HARVESTED PRODUCT FLOW

BACKGROUND OF THE INVENTION

The present invention relates to a metal detector for detecting metal in a harvested product flow, in particular between rotatable machine elements of harvesters, such as for example field choppers.

Manufacturers usually arrange metal detectors in a supply roller located before a cutter drum. The producers prefer supply rollers with a casing composed of a non-magnetic steel from operational as well as wear-related reasons. All metal detectors operate with permanent magnets, whose field lines extend through the roller casing and through the harvested product flow passage. One of such metal detectors is disclosed for example in U.S. Pat. No. 3,972,156. In this metal detector, a conductor is wound to form a coil, and the coil extends over the whole width of the supply roller. Such coils produce no position signal when the metal is located in the middle of the magnetic or coil arrangement.

Solutions have been proposed to eliminate this disadvantage by arranging several successive coils or coil-magnetic systems with the coils which overlap partially. The coils are connected with different magnet polarity in an addition or compensation circuit and supply a combined signal to a signal processing device. The signal processing device amplifies the produced combined signal of all coils, filters it, and compares with a threshold value which is greater than a disturbance signal caused by disturbances. If the combined signal is greater than the threshold value, the signal processing device produces a signal which activates a stopping device of the supply roller, so that the supply roller and therefore the harvested product flow is stopped in a shortest possible time.

German patent document D-OS41 40 812 discloses a device for detecting ferromagnetic foreign bodies, in which the magnetic field generation has an odd number of magnetic poles and the magnetic poles are arranged in a line transversely to the harvested product flow passage. The receiving coils are connected in series, so that the voltages induced in them are added. When a supply roller of synthetic plastic material is utilized, no disturbances caused by the supply roller occur. When the supply rollers have a casing composed of a non-magnetic steel, magnetic inhomogeneities (ferritic structures) are located in the roller casing material. They cause disturbances because of their proximity to the magnet and therefore limit the sensitivity.

A further disturbance cause is the eddy current effect. During the movement of the electrically conductive roller casing through a magnetic field, electric current is induced in it and forms a magnetic field which disturbs the detector field. Since the disturbance voltages depend on the rotary speed and the electrical resistance of the roller casing, they are the causes for a disturbance level which is difficult to detect. Thereby the sensitivity of all such circuits is limited. Also, the utilization of hall sensors and inclinedly expanding magnetic fields provide a space economy, but not any improvement of the sensitivity, as is clear for example from the European patent document EP 0666 021.

A metal detector for detecting metal foreign bodies disclosed in the European patent document EP 0702 248 provides a correct location of the metal part through the coil arrangement. Since however the coils are assembled in a star circuit and a sum signal from all coil voltages are evaluated, the sensitivity is here substantially reduced by the previously mentioned disturbance source.

SUMMARY OF THE INVENTION

Accordingly, it is an object of the present invention to provide a metal detector for detecting metal in a harvested product flow, which avoids the disadvantages of the prior art.

More particularly, it is an object of the present invention to provide a metal detector for detecting metal in a harvested product flow, which has a sensitivity increased relative to unavoidable disturbance signals and provides a detection of metallic foreign bodies in a simple manner.

In keeping with these objects and with others which will become apparent hereinafter, one feature of the present invention resides, briefly stated, in a metal detector for detecting metal in a harvested product flow, in which an amplifier and a filter is separately connected to each of the coils, and a threshold value switch follows the amplifier and the filter, the outputs of all threshold value switches are connected with one another through an OR-gate, and a starting device is connected with the OR-gate.

When the metal detector is designed in accordance with the present invention, it avoids the disadvantages of the prior art, and provides for the above mentioned highly advantageous results.

In accordance with a further feature of the present invention, the amplifiers of the coils have different amplification factors.

In accordance with still a further feature of the present invention, the filters which are connected to the amplifiers have different filter characteristics.

It is still another feature of the present invention that the threshold value switches can have different threshold values.

Finally, each of the threshold value switches is connected with one of the controlled threshold value switches or a response indicator.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a circuit of a metal detector for detecting metal in a harvested product flow.

DESCRIPTION OF PREFERRED EMBODIMENTS

A metal detector in accordance with the present invention substantially has a magnetic trough 1 which is fixedly integrated in one of the supply rollers of an agricultural machine. Three permanent magnets 2, 3, 4 are located in the magnetic trough 1. Coils 5, 6, 7 surround the permanent magnet 2, 3, 4 for a signal generation.

The metal detector is further provided with amplifiers 8, 9, 10 each separately connected to a coil output of a corresponding coil. The metal detector further has filters 11, 12, 13 each connected to a corresponding one of the amplifiers 8, 9, 10. Threshold values switches 14, 15, 16 are individually connected to the filters 11, 12, 13. The metal detector further has an OR-circuit 17 arranged so that the outputs of all threshold values switches 14, 15, 16 are connected to the OR-gate 17. The amplifiers 8, 9, 10, the filters 11, 12, 13, the threshold value switches 14, 15, 16, and the OR-gate 17 together form a signal processing unit 18. A stopping device 19 is connected to the output of the signal processing unit 18 which is simultaneously the output of the OR-gate 17.

The voltages induced in the coils 5, 6, 7 are amplified, filtered and supplied to the associated threshold value switches 14, 15, 16. When the amplified and filtered signal voltage U is greater than an adjustable threshold value voltage $U_{thr}$, a stopped signal is produced in the corresponding one of the threshold value switches 14, 15, 16, independently from one another. This stop signal is further supplied to the OR-gate 17. Thereby the OR-gate 17 is activated and the stop device 19 is controlled so as to stop the drive of the supply rollers. Simultaneously, it is shown, which of the coils 5, 6, 7 has produced the stop signal, so that the position of the foreign body is located in a simple manner.

The above described separate signal processing has the advantage that the useful signal produced by the foreign body through one of the permanent magnets 2, 3, 4 is greater relative to a disturbance signal produced through the corresponding permanent magnet 2, 3, 4, when the signals of all permanent magnets 2, 3, 4 are added. Thereby the interval between the useful signal and the disturbance signal is greater and is separately adjustable in each circuit branch. As a result, the useful signal-disturbance signal interval is improved when compared with known arrangements, and the separate adjustability of the individual threshold values can provide for an optimal adjustment of the metal detector to machine conditions.

In accordance with the present invention, the amplifiers 8, 9, 10 of the coils 5, 6, 7 can have different amplification factors. The filters 11, 12, 13 which are connected with the amplifiers 8, 9, 10 can have different filter characteristics. The threshold value switches 14, 15, 16 can have different threshold values. Also, a response indicating device can be connected with each of the threshold value switches 14, 15, 16.

It will be understood that each of the elements described above, or two or more together, may also find a useful application in other types of constructions differing from the types described above.

While the invention has been illustrated and described as embodied in metal detector for detecting metal in harvested product flow, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A metal detector for detecting metal in a harvested product flow, comprising a plurality of permanent magnets, spaced from one another and producing a magnet field which passes through a harvested product flow region; a plurality of coils each surrounding a respective one of said permanent magnets so that when a foreign body passes through said magnet field useful signals are produced; a signal processing unit operative for processing of the produced useful signals; a plurality of amplifiers and filters each connected to a respective one of said coils; a plurality of threshold value switches each connected with a respective one of said amplifiers and said filters and having output; an OR-circuit connected with said outputs of said threshold value switches; stopping means connected with said OR-circuit; and a plurality of response indicating devices each connected with a respective one of said threshold value switches.

2. A metal detector as defined in claim 1, wherein said amplifiers of said coils have different amplification factors.

3. A metal detector as defined in claim 1, wherein said filters connected with said amplifiers have different filter characteristics.

4. A metal detector as defined in claim 1, wherein said threshold value switches have different threshold values.

5. A metal detector for detecting metal in a harvested product flow, comprising a plurality of permanent magnets, spaced from one another and producing a magnet field which passes through a harvested product flow region; a plurality of coils associated with each surrounding a respective one of said permanent magnets so that when a foreign body passes through said magnet field useful signals are produced; a signal processing unit operative for processing of the produced useful signals; a plurality of amplifiers and filters each connected to a respective one of said coils; a plurality of threshold value switches each connected with a respective one of said amplifiers and said filters and having output; an OR-circuit connected with said outputs of said threshold value switches, stopping means connected with said OR-circuit, said amplifiers of said coils having different amplification factors, said filters connected with said amplifiers having different filter characteristics; and a plurality of response indicating devices each connected with a respective one of said threshold value switches.

* * * * *